UNITED STATES PATENT OFFICE.

WASHINGTON BECK, HENRY FEURHAKE, AND WILLIAM A. O. WUTH, OF PITTSBURG, PENNSYLVANIA.

IMPROVEMENT IN METHODS OF CLEANING GLASS-MOLDS.

Specification forming part of Letters Patent No. 221,022, dated October 28, 1879; application filed October 2, 1879.

*To all whom it may concern:*

Be it known that we, WASHINGTON BECK, HENRY FEURHAKE, and W. A. OTTO WUTH, all of the city of Pittsburg, in the county of Allegheny and State of Pennsylvania, have invented a new and useful Improvement in Methods of Cleaning Glass-Molds; and we do hereby declare the following to be a full, clear, and exact description thereof.

Our invention consists of a new and useful method of cleaning glass-molds and plungers.

These molds and plungers are made of cast-iron, and the molding-face, which is either plain or figured, is finished by polishing with a stone and oil. For this purpose a fine-grain free-stone or sandstone is generally used. In some cases the finer grades of emery are used. The finish of the molds and plungers must be very fine and smooth. When in use they are subjected to a continuous alternate heating and cooling by the dropping and pressing of the heated plastic glass therein and the opening of the mold to remove the article. The effect of the working upon the mold or plunger is the formation on the surface thereof of a black coating of magnetic oxide of iron, which is very hard—so hard, indeed, that when not removed for some time it will turn the edge of a file. This coating is very objectionable, as it gives a greasy and lusterless appearance to the glass. It is therefore removed whenever it is possible, and the operation of removing it which is now in use is slow and expensive, and consists of rubbing the coated surface with a stone dipped in oil, and in some cases with fine emery. This operation, which is repeated daily when a mold is in use, will, in a plain mold of ordinary size, occupy from one to two hours. When, however, it has a pattern in it, the operation of cleaning becomes also a very delicate one, the difficulty being increased with the greater intricacy or fineness of the pattern.

Usually the aim of glass-makers is to produce pattern articles as nearly resembling cut ware as possible, and this resemblance depends on the sharpness and clearness of the lines and the brilliancy of the surface of the glass. In such molds the operation of scouring or rubbing off the coating is generally attended with the obliteration of the sharp lines and the rubbing off of points and edges, this being due, in the first place, to the carelessness of the workmen, and in the second to the great difficulty, if not utter impossibility, of making and keeping on the rubbing-stone a suitable point for penetrating and operating in the recesses of the mold.

There are many molds the pattern of which is so intricate or so difficult of access that it is preferred to let them remain coated with the oxide rather than permit them to be touched with a stone at the risk of having them injured.

There are other molds which have a peculiar mottled rough surface, designed to produce ware with brilliant crystalline surfaces, that cannot be cleaned at all by the stone, as it would entirely destroy their surface. On the other hand the coating of magnetic oxide, when formed thereon, as it is by one day's use, destroys the peculiar effect of the mottled rough surface on the ware. Such molds would, therefore, soon become useless.

When a mold is coated with the oxide it heats up more rapidly and retains the heat much longer than a clean mold, the result of which is, that the glass sticks to it and works more slowly and difficultly.

In plain glassware brilliance of surface is the desideratum, and this can be attained only by keeping the molds clean. The rubbing of the stone or emery soon enlarges and makes the mold of such ware out of shape, and rounds off the jointing edges of the mold-sections, thereby causing the production of a fin on the article. In short, this operation of cleaning the molds by scouring is one of the most objectionable things practiced (it has been supposed necessarily) in connection with the manufacture of molded glassware. Molds do not wear out by use, but by the cleaning.

By our invention the mold is cleaned perfectly of the magnetic oxide and restored to its first finish within a few minutes, without destroying, injuring, or changing its original surface or pattern; and it consists in submitting or treating the mold to a bath of dilute acid in the presence of a metal or alloy which is more electro-positive than the iron mold.

To enable others skilled in the art to make use of our invention, we will now describe its use and operation.

We prepare a bath of diluted acid, preferably sulphuric acid, and into this bath we introduce a piece of zinc or some other metal or alloy which is more electro-positive than the iron of the mold. We then immerse the mold or plunger which is to be cleaned of the coating or film of magnetic oxide into the bath.

The operation of the bath is as follows: The magnetic oxide of iron is composed of peroxide of iron and protoxide of iron. The acid, attacking the zinc, decomposes the water and produces hydrogen, which acts upon the magnetic oxide, reducing the peroxide to protoxide, which is either dissolved by the acid in excess, or its cohesion to the iron is entirely overcome, so that it can be brushed or rubbed off.

After the mold has remained in the bath a few moments, or a sufficient time to reduce and soften the oxide, the strength of the acid and the thickness of the coating being considered, it is washed in clean water, and then dipped in an alkaline solution, to neutralize the acid remaining on or adhering to it. The protoxide may then be rubbed or brushed off by means of a cloth or a stiff brush.

The entire operation occupies but a few moments, and the most intricate and delicate patterns and configurations can be cleaned perfectly and restored to their original finish without any injury to or change in the mold or plunger. Molds which heretofore could not be cleaned at all can be cleaned daily with as much ease as the plainest pattern.

The presence of the electro-positive metal or alloy in the bath prevents the acid from attacking the iron of the mold, so that the mold can be left in the bath for a long time—say thirty minutes—without danger of injury. It also enables us to use a more dilute acid, as it creates a magnetic current, which causes a more rapid action.

The ware produced in molds so cleansed will have all the brilliance of surface, sharpness of outline, and uniformity that was obtained when the mold was new; also, the production of the mold will not be decreased, as is the case with molds which are much coated with the oxide; also, the mold will last very much longer than a mold will under the former system of cleaning.

Other acids, such as muriatic, acetic, hydrochloric, hydrobromic, hydroiodic, and others, may be used.

What we claim as our invention, and desire to secure by Letters Patent, is—

The method of cleaning glass-molds and plungers hereinbefore described—that is to say, submitting the molds and plungers to a bath of diluted acid in the presence of a metal or alloy which is more electro-positive than the iron mold or plunger, and then neutralizing the acid by an alkaline solution, substantially as and for the purposes set forth.

In testimony whereof we, the said WASHINGTON BECK, HENRY FEURHAKE, and W. A. OTTO WUTH, have hereunto set our hands.

WASHINGTON BECK.
HENRY FEURHAKE.
WILLIAM AUGUST OTTO WUTH.

Witnesses:
JNO. K. SMITH,
T. B. KERR.